(12) United States Patent
Joshi et al.

(10) Patent No.: US 12,354,156 B2
(45) Date of Patent: Jul. 8, 2025

(54) SYSTEM AND METHOD FOR DATA EXTRACTION

(71) Applicant: NCR Voyix Corporation, Atlanta, GA (US)

(72) Inventors: Mihir Joshi, Atlanta, GA (US); Kyle Wade, Dallas, TX (US); Brian A. Klotzman, Lewisville, TX (US); Eric Smith, Grapevine, TX (US)

(73) Assignee: NCR Voyix Corporation, Atlanta, GA (US)

( * ) Notice: Subject to any disclaimer, the term of this patent is extended or adjusted under 35 U.S.C. 154(b) by 487 days.

(21) Appl. No.: 17/966,521

(22) Filed: Oct. 14, 2022

(65) Prior Publication Data
US 2024/0127323 A1   Apr. 18, 2024

(51) Int. Cl.
*G06Q 30/0601* (2023.01)
*G06F 40/103* (2020.01)
*G06F 40/166* (2020.01)
*G06Q 50/12* (2012.01)
*G06V 30/414* (2022.01)

(52) U.S. Cl.
CPC ....... *G06Q 30/0641* (2013.01); *G06F 40/103* (2020.01); *G06F 40/166* (2020.01); *G06V 30/414* (2022.01); *G06Q 50/12* (2013.01)

(58) Field of Classification Search
USPC .......................................................... 382/177
See application file for complete search history.

(56) References Cited

U.S. PATENT DOCUMENTS

| | | | | |
|---|---|---|---|---|
| 2021/0342723 A1* | 11/2021 | Rao | ......................... | G06Q 40/12 |
| 2021/0342914 A1* | 11/2021 | Dalal | ...................... | G06V 20/20 |
| 2022/0070388 A1* | 3/2022 | Nihas | ...................... | H04N 23/60 |

* cited by examiner

*Primary Examiner* — Darryl V Dottin
(74) *Attorney, Agent, or Firm* — Notaro, Michalos & Zaccaria P.C.; John S. Economou (57) ABSTRACT

A system and method of data extraction is disclosed. An image file of a scan of a printed information list is received at a server via a network connection. When not in portable document format, the received image file is processed with an optical character recognition (OCR) engine at the server to identify all text therein and then the processed image file is stored in a memory. When in portable document format, the image file is processed using metadata and positional data at the server to generate sentences; process the sentences to identify prices, descriptions, items, and categories; link each identified item to an associated price, description, and category; and extract and link all modifiers from identified description, and then all identified and extracted information is stored in memory. A user interface is provided to a user via the server for graphically visualizing and editing a stored processed file.

20 Claims, 6 Drawing Sheets

Category – Antipasto 520

Item - Artichoke Hearts 530

Price – 6.95 540

Description - breaded, fried, serviced with butter sauce 550

Item - Mozzarella di Fritto

Price - 7.50

Description - cheese sticks with marinara     Item - Zucchini         Price - 6.95

Description - crispy outside, hot & juicy inside, served with marinara sauce     Item - Ravioli, Fried         Price - 6.95

Description - cheese-filled, served with marinara     Item - Sampler Combination of Above         Price - 8.50

Item - Shrimp Oreganata

Price - 8.95

Description - baked with seasoned bread crumbs     Item - Calimari         Price - 9.25

Description - served golden brown with marinara Category – Pasta 520

Item - Pasta Lover's Special 540

Price – 17.50 550

Description - Four different pastas with meat sauce, meatball, sausage and sautéed mushrooms 560

Item - Vegetable Lasagna

Price - 17.50

Description - Layers of Pasta, Vegetables and Cheese baked with marinara     Item - Chicken Ravioli Price - 16.50

Description - Rosatella sauce, mozzarella baked

SYSTEM AND METHOD FOR DATA EXTRACTION

FIELD

This disclosure relates generally to a system and method for data extraction, and, more particularly, to a system and method for extracting data from printed information lists such as a restaurant menu and selectively linking the extracted data within a user interface.

BACKGROUND

Modern point of sale systems and online ordering systems for restaurants are designed to address and streamline the operational needs of the restaurant. One requirement of such systems is that the restaurant menu data (e.g., the items available and associated price of each item) must be obtained, often from printed menus. This process is time-consuming when performed by hand and is difficult to automate because of the varied nature of each restaurant's menu, in terms of both content (e.g., items available) and presentation (e.g., menu layout).

Accordingly, there is a need for a more efficient way to extract data from printed information lists such as a restaurant menu.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The system and method of the present disclosure provides an efficient way to extract data from printed information lists such as menus and the like. This system and method combine a machine learning-based optical character recognition (OCR) engine with a specialized web-based user interface in order to provide a complete solution for quickly and efficiently extracting all the necessary information from a printed information list (menu).

Figure 1:
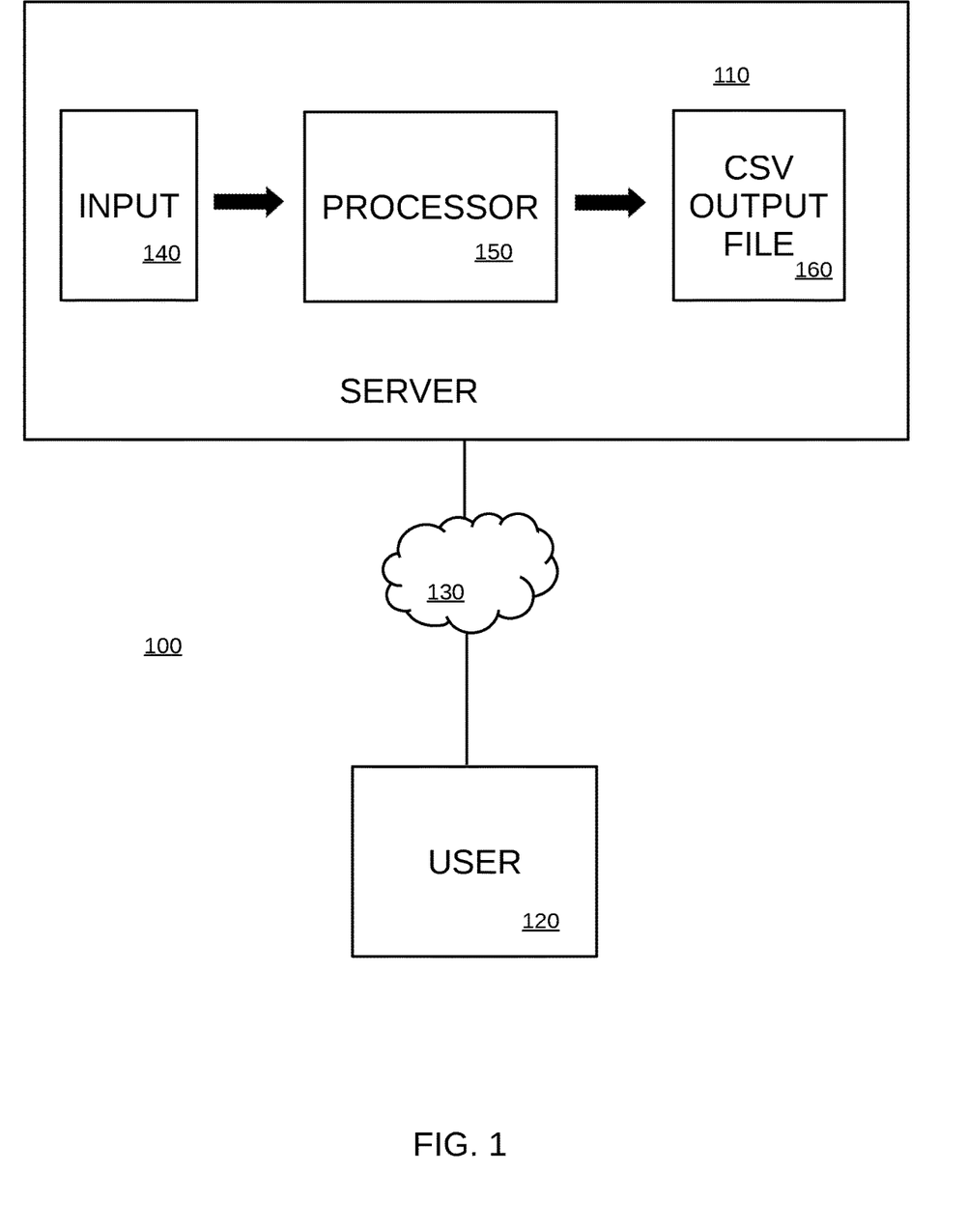
FIG. 1 is a block diagram of the system of the present disclosure.

Referring now to FIG. 1, a system 100 includes an application server 110 coupled to a user computer 120 via a network 130. The server 110 provides a user with a user interface 300 (FIG. 3) via a web server program. A web application consisting of a menu processor program 150 runs in conjunction with the web server program and provides processing, as discussed in detail with respect to FIG. 6, of an input file 140 (e.g., a scanned menu) in order to generate an output file 160 (e.g., a comma separated value, or CSV, file) in a form useful for digital processing (e.g., populating a database for an online ordering system or configuring a point-of-sale system).

Figure 2:
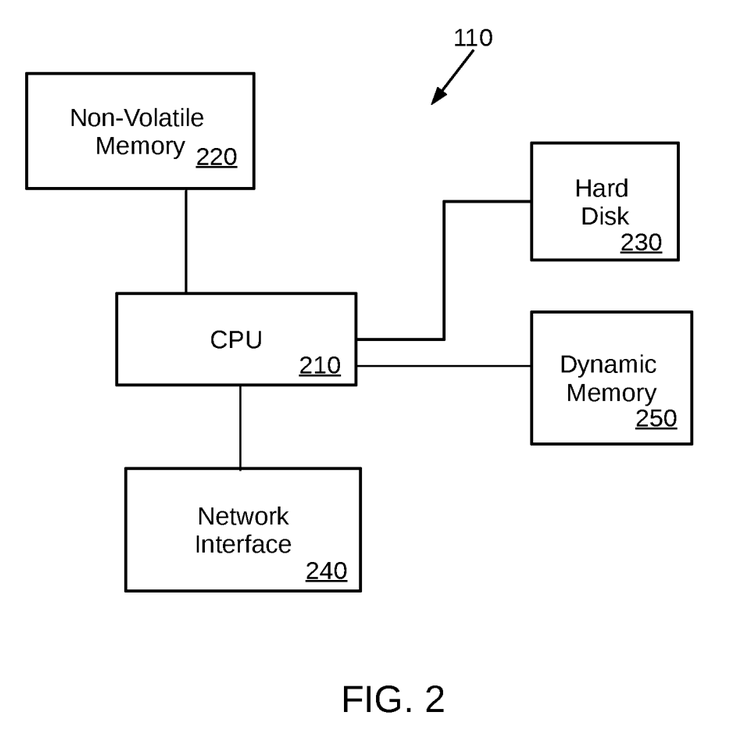
FIG. 2 is a block diagram of a server for use in the system of the present disclosure.

As shown in FIG. 2, the server 110 may include one or more central processing units (processors) 210, a network interface 240, at least one hard disk (HD) 230, volatile (dynamic) memory 250, and non-volatile memory 220. The non-volatile memory 220 includes a basic input/output system (BIOS) used to initiate a boot of the server 110. The HD 230 may be any type of non-volatile memory device (i.e., a non-transitory computer-readable storage medium) used to hold an operating system for a computer-based system and the term "hard disk" as used herein is intended to be broadly defined to include both electro-mechanical data storage devices and solid state drives. The HD 230 holds the programs (software applications, including for example a web server program and one or more web applications which run in conjunction with the web server program) which load into volatile memory 250 upon boot of the operating system to provide the functionality discussed herein. It is to be noted that the components are shown schematically in greatly simplified form, with only those components relevant to understanding of the embodiments being illustrated. The various components (that are identified in FIG. 2) are illustrated and the arrangement of the components is presented for purposes of illustration only. It is to be noted that other arrangements with more or less components are possible without departing from the teachings of the system and method presented herein. Server 110 may also be implemented on a virtual machine as known in the art.

Figure 3:
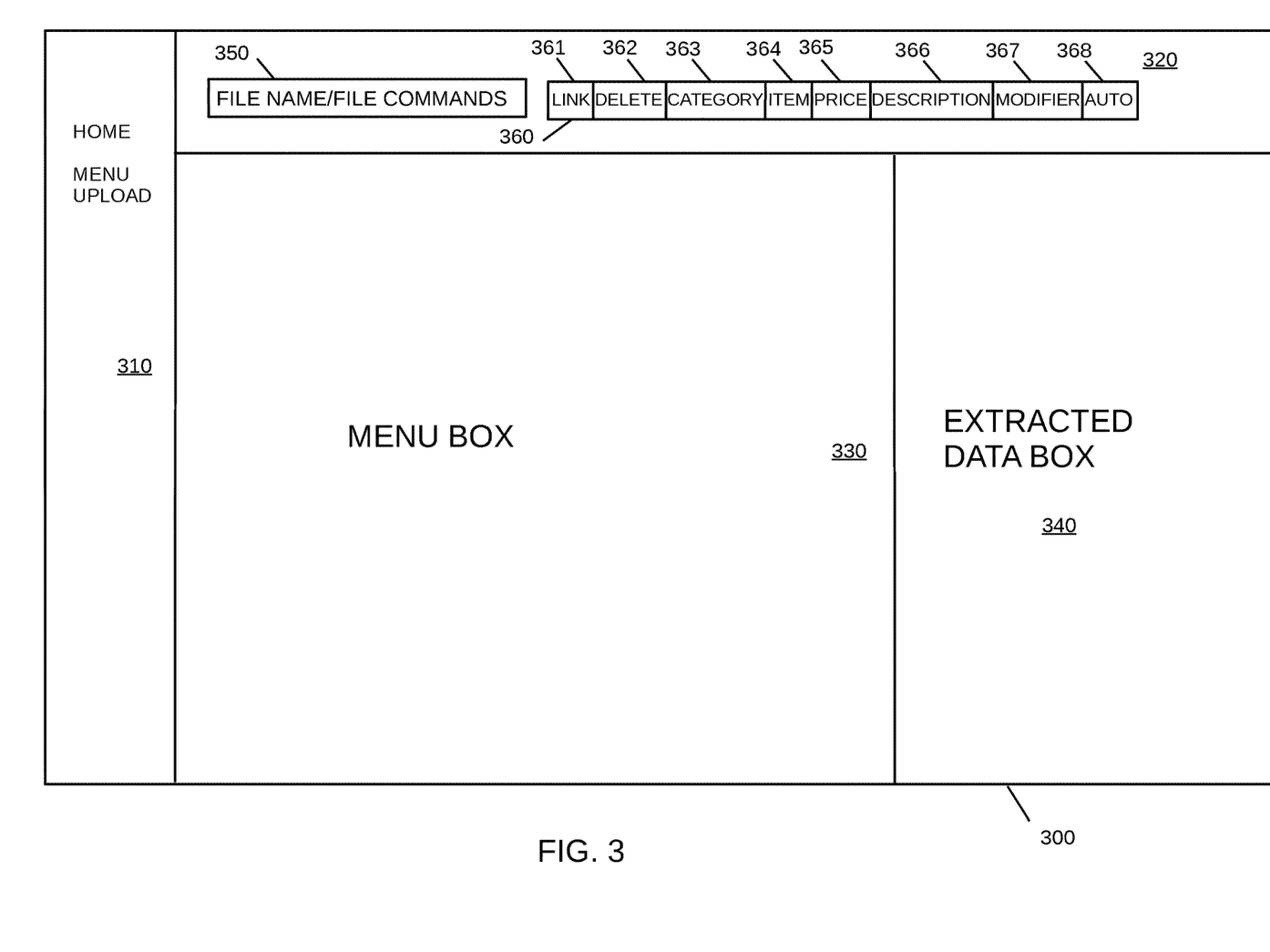
FIG. 3 is a diagram of the user interface provided for using the system of the present disclosure.

The user interface (UI) 300 is shown in FIG. 3. UI 300 includes a start portion 310 used to initiate menu processing and load a menu, a command portion 320, a menu pane 330, and an extracted data pane 340. Command portion 320 includes a first portion 350 for file commands or file information (e.g., current filename, cancel, file save, file save as for versioning, and file export) and a second portion 360 for processing commands. These commands include link 361, delete 362, category 363, item 364, price 365, description 366, modifier 367, and auto 368. These commands are discussed further below. The menu pane 330 displays the current menu being processed (see FIG. 4) and provides the capability to scroll across pages of a multi-page menu. The extracted data pane 340 shows the current status of the information being extracted from the current menu (see FIG. 5).

Figure 4:
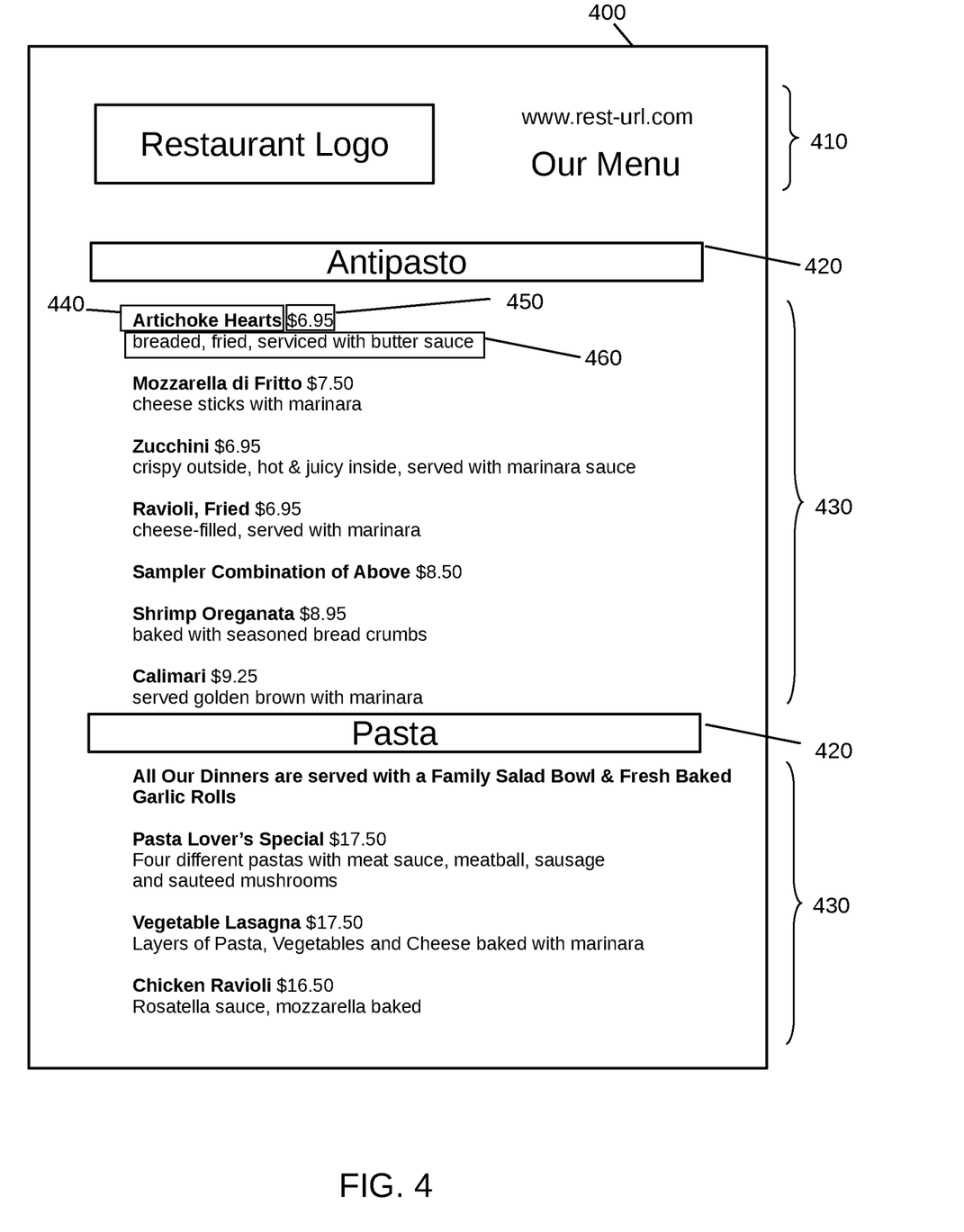
FIG. 4 is a diagram of a sample menu for use in demonstrating the operation of the system of the present disclosure.

A sample menu 400 (as would appear in menu pane 330 in FIG. 3) is shown in FIG. 4. The menu 400 includes a header portion 410, a series of categories 420 (antipasto and pasta are shown as examples in FIG. 4), and a series of menu items 430 in each category. Each menu item typically includes an item name 440, a price 450, and a description 460 of the item.

Figure 5:
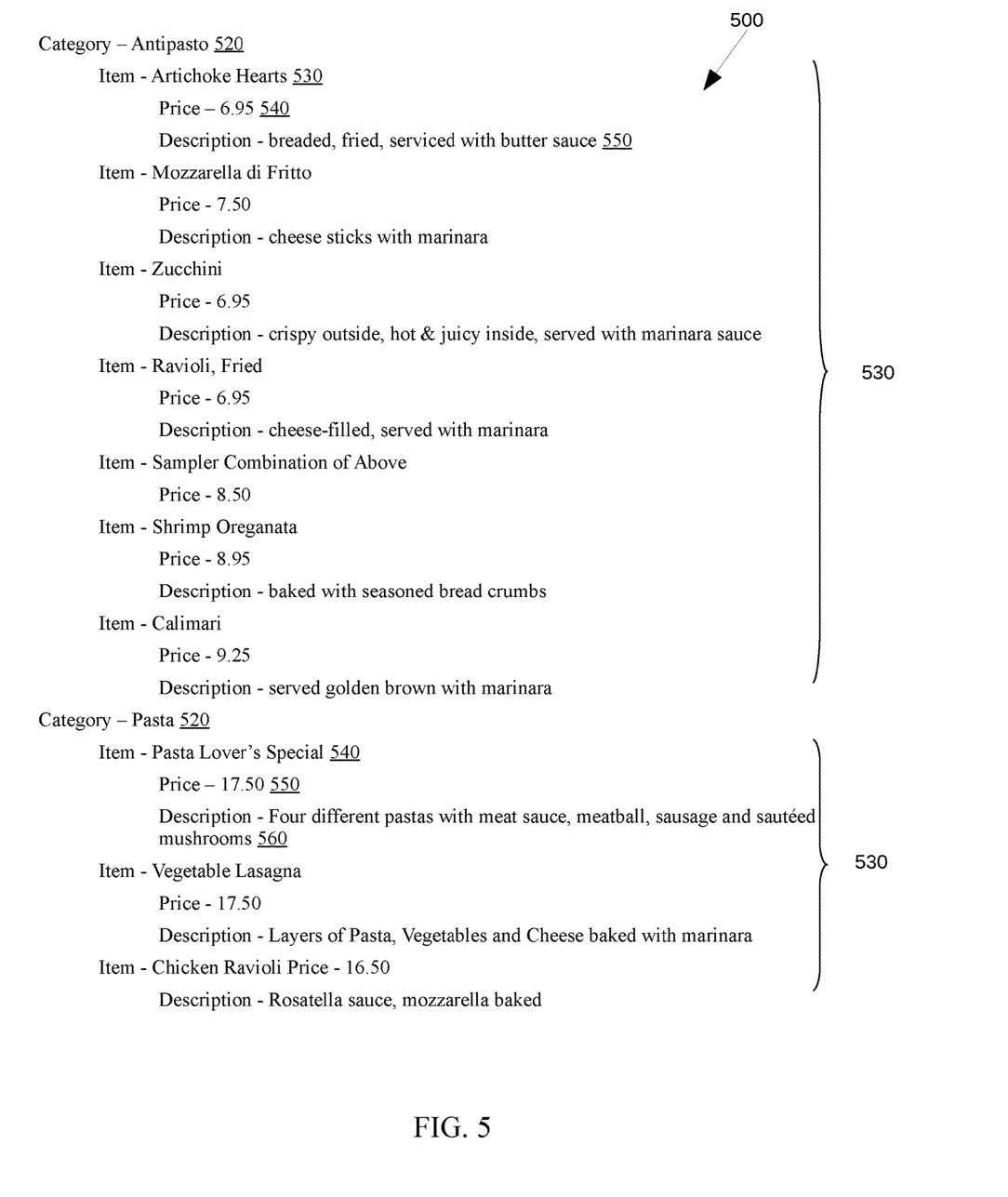
FIG. 5 is a depiction of the extracted data pane portion of the user interface of FIG. 3 after processing the menu of FIG. 4.

A sample extracted data pane 500 (as would appear in extracted data pane 340 in FIG. 3) is shown in FIG. 5. Extracted data pane 500 is shown after the completion of processing of the sample menu 400 and includes categories 520 and menu items 530 for each of the categories 520. Each of the menu items 530 includes an item name 540, a price 550, and a description 560. Once the processing of the system and method of the present disclosure is complete, the information within extracted data pane 500 is saved to a file, e.g., a CSV file or equivalent.

Figure 6:
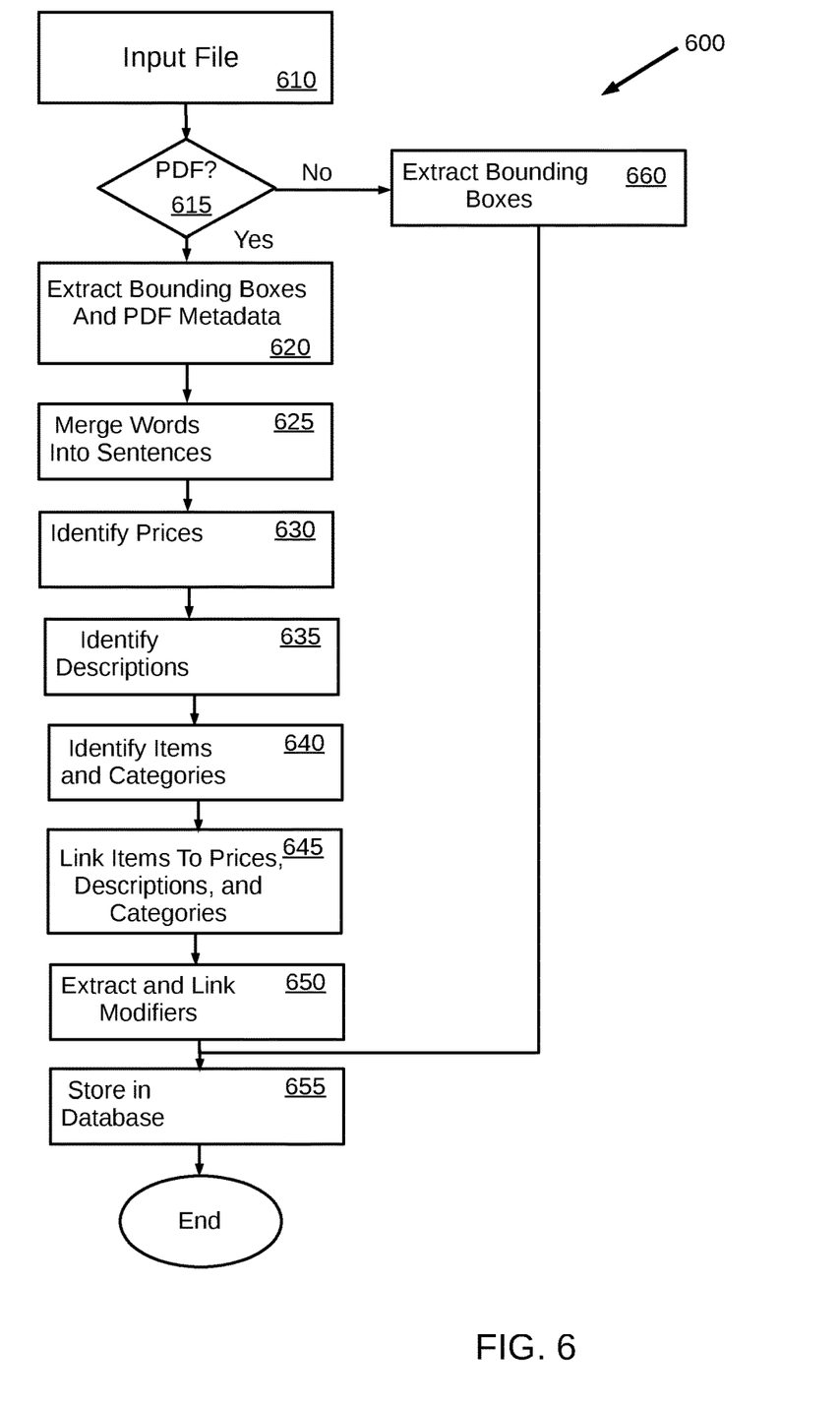
FIG. 6 is a flowchart showing the operation of the system and method of the present disclosure.

As shown in FIG. 6, a first part of the system and method of the present disclosure is a method 600 which automatically detects and links identified menu entities. The method 600 first scans a menu image automatically to look for common menu entities such as price, categories and items and provides a best guess effort to link these pieces of data together. All the information used to convert the image of the menu to a digital menu file is retained, which allows a customer to easily implement price changes by scanning an updated menu and then importing and applying any price changes.

According to the method 600, a scan file of a menu is first input at step 610, and then it is determined at step 615 if the input file is a portable document format (PDF) file or a pure image file.

If the uploaded file is an image file, processing proceeds to step 660, where bounding boxes are generated with respect to all elements (e.g., words, numbers, etc.) detected within the image and extracted there from. More specifically, the processing at step 660 may include processing the image file with an OCR engine to identify all text-based elements present in the image file and generate/extract bounding boxes encompassing the identified elements. Then, at step 655, this information (raw data) is stored in a database. This raw data is then available via the UI 300 to allow the user to create new annotations/associations of the detected elements without having to manually input the information.

When the uploaded file is a PDF file, processing proceeds to step 620. Every page within the PDF file is processed separately, serially or, to expedite the process, in parallel. When a ten-page PDF file is processed in parallel, for example, a speed increase of up to 300 percent can be achieved. One benefit of a PDF file is that it provides access to metadata such as font name and font size. This metadata is stored along with the bounding boxes within the PDF file that are extracted at step 620.

Next, at step 625, the characters in the PDF file are processed one-by-one. This initial processing combines detected words into sensible sentences. This process is aided by using font metadata and positional data as menu wording is not often organized into complete sentences. In one example embodiment, the file is processed character-by-character, from left to right. Each character is evaluated to determine if it is a separator-type character. If so, a separator count is updated for identifying the descriptions later. If the character is a blank space, the next X (e.g., ten characters) are also checked to see if they are blank spaces. If so, this is considered as the end of a current sentence, and a new sentence is designated. The font and font size of each current character is compared to the font and font size of the previous character, and if either is found to be different, a new sentence is designated. This is for handling cases where an item and a description are on a same line with different fonts and/or different font sizes.

At step 630, the price information is tagged by, for example, stripping every occurrence of a currency symbol (e.g., dollar sign) and then designating every number having a value less than a certain amount (e.g., 1,000) as a price. All detected numbers may be first designated as provisional prices, but the processing may remove extraneous numbers at the outset, e.g., four-digit numbers are treated as a year, a number in parentheses is considered a quantity, and a ten-digit number is considered a phone number.

At step 635, descriptions are identified based on a number of separators contained therein. In particular, a ratio is calculated between the separator count and the total character count for each individual (different) font found. If the calculated ratio is above a particular threshold (e.g., 0.3), that font is considered to be a description font, and all lines with that font are designated as descriptions. The separators may be English function words (prepositions, conjunctions, etc.) or can be punctuation symbols.

At step 640, all of the items are then tagged by identifying the one font (or several fonts) that appears most frequently on the page, but which is not used for either a description or a price. The category is also tagged, at this step, based, for example, on the assumption that the number of categories should not exceed the number of items. More specifically, the categories may be tagged based on a font that occurs with less frequency than a font for the items and which is not used for either a description or price. In some cases, the font frequency threshold may be reduced in order to tag more words as items in cases where the number of identified items is below a predetermined threshold. This may be particularly useful in situations where the menu does not include prices and/or descriptions. Steps 620 to 640 constitute a first identification phase.

At step 645, the items and prices/descriptions are linked together by starting from the top of a current page, and then linking each item to the closest price/description to the right and/or immediately below. The same logic is then applied to link each item to an associated category. The detected categories may be used to divide the current page into columns and associate each item to a closest category at the top of and in the same column.

Finally, at step 650, all noun phrases are extracted from the identified descriptions, designating them as modifiers and attaching the extracted information to an associated item. For example, consider a menu entry which reads "This delicious hamburger comes on your choice of a sesame seed bun or whole wheat bun and includes lettuce, pickle, and tomato." All of the nouns and phrases including "sesame seed bun," "whole wheat bun," "lettuce," "pickle," and "tomato" would be designated as modifiers that are attached to the item (i.e., the hamburger). Steps 645 and 650 constitute a second entity linking phase. Once all the information is collected via steps 620 to 650 (for each page), the information is stored at step 655.

A second part of the system and method of the present disclosure is a modern, responsive web user interface (i.e., UI 300 in FIG. 3) for graphically visualizing the menu data and associations between detected menu data elements and providing user intelligent tools which allow a user to adjust and finalize the data extraction and linking before completing the information extraction. UI 300 is used to upload a new menu file for processing. If the uploaded menu file is in PDF format, the menu is processed by the method of flowchart 600 in order to extract all (or nearly all) the data from a menu, e.g., menu 400 in FIG. 4, into the extracted data pane (FIG. 5). If the uploaded menu file is not in PDF format, or if some cleanup is required in order to finalize the process, the remaining commands within pane 360 can be used. The link command 361 is used to link an item to a price, or an item to a category (e.g., by clicking on the command and then using a mouse (or the like) to draw a box around the elements to be linked within menu pane 330). The delete command 362 is used to delete items from extracted data pane 340. The category command 363 is used to designate a category (e.g., the category 420 of antipasto in FIG. 4). The item command 364 is used to designate an item (e.g., the item 440 of artichoke hearts in FIG. 4). The price command 365 is used to designate prices (e.g., the price 450 of $6.95 in FIG. 4). The description command 366 is used to designate descriptions of items (e.g., the description 460 of "breaded, fried, or serviced with butter sauce" in FIG. 4). The modifier command 367 is used to designate item modifiers (e.g., a modifier is an added cost item, such as "extra meatball"). Modifiers will have an associated price. The auto command 367 is used to initiate the auto-linking process discussed below. A user can quickly complete the extraction process for an uploaded menu in PDF format using the various tools in toolbar 360, or efficiently perform the process, when the uploaded menu is in a format other than PDF. Once the process is complete, the user then exports the extracted data into a file in a suitable format, e.g., CSV, for further use in a point-of-sale system or an online ordering system.

The UI 300 provides adaptive threshold text selection, dynamic line detection, automated annotation suggestions, automatic linking, and user input (as discussed above).

For adaptive threshold text selection, a user draws a box with their mouse to select text in the menu pane 330. The UI 300 then checks to determine if any text is more than X percent (e.g., X=60) contained in the drawn box. If so, that text (and only that text) is selected. If not, the threshold is reset to a lower number, e.g., thirty (30) percent, and the check is repeated. This can be done iteratively, reducing the threshold each time. The thresholds may, in some cases, be set based on machine learning, adaptively adjusting the threshold over time as more data is obtained.

For dynamic line detection, a user draws a large box with their mouse that covers multiple lines/text rows in the menu pane 330. UI 300 determines the line position for each word of the selected text by the amount of vertical overlap of each word to existing lines (or to the first word in the upper left corner of the box which is designated as a new line). If a word has at least X percent (e.g., 60%) overlap with an existing line, it is designated as on that line. If the overlap does not meet this threshold, the text is considered a new line. Here again, the threshold may, in some cases, be set based on machine learning, adaptively adjusting the threshold over time as more data is obtained.

For automation annotation suggestions, when a user manually selects a category, item, or price, the metadata from that annotation is extracted. The extracted text metadata is then used (font, style, size, position) to determine and suggest other text that matches that type.

For automatic linking, when a user links a price to an item, the menu is scanned for unlinked prices. Based on position of the prices and unlinked items on the menu, automatic links are suggested, preferably based on prices that are below and/or to the right of the unlinked item. In other cases, a proximity factor can be used to designate a price for an unlinked item.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method of data extraction, comprising:
   receiving an image file of a scan of a printed information list at a server via a network connection;
   determining, at the server, if the image file is in portable document format;
   when the image file is not in portable document format, processing the received image file with an optical character recognition (OCR) engine at the server to identify all text therein and storing the processed image file in a memory coupled to the server;
   when the image is in portable document format, processing the image file using metadata and positional data at the server to:
   generate sentences,
   process the sentences to identify prices, descriptions, items, and categories,
   link each identified item to an associated price, description, and category, and
   extract and link all modifiers from each identified description; and
   storing all identified and extracted information as a processed portable document format file in the memory; and
   providing a user interface via the server for graphically visualizing and editing a selected one of a stored processed image file or a stored processed portable document format file, the user interface including a first pane for displaying the scan of the printed information list, a second pane for displaying a status of the identified and extracted data from the printed information list, and a set of commands for editing the identified and extracted information.

2. The method of claim 1, wherein when the image is in portable document format, the image file is processed using metadata and positional data at the server to generate sentences by processing text information character-by-character, from left to right, and designating a new sentence when a predetermined number of blank spaces are found, a new font is found, or a new font size is found.

3. The method of claim 1, wherein when the image is in portable document format, the image file is processed using metadata and positional data at the server to identify prices by stripping each currency symbol and designating each number having a value less than one thousand as a price.

4. The method of claim 3, wherein when the image is in portable document format, the image file is processed using metadata and positional data at the server to identify items by identifying one or more fonts that appear most frequently but which are not used for a description or a price.

5. The method of claim 4, wherein when the image is in portable document format, the image file is processed using metadata and positional data at the server to identify categories by identifying fonts which occur less frequently than fonts for items and which are not used for a description or a price.

6. The method of claim 4, wherein when the image is in portable document format, the image file is processed using metadata and positional data at the server to link each item among the identified items to an associated price by identifying a price among the identified prices closest to and immediately to a right of or below that item.

7. The method of claim 1, wherein when the image is in portable document format, the image file is processed using metadata and positional data at the server to identify descriptions by calculating a ratio between a separator count and a total character count for each different font found, and designating all text having the associated font as descriptions responsive to the calculated ratio being above a predetermined threshold.

8. The method of claim 7, wherein when the image is in portable document format, the image file is processed using metadata and positional data at the server to identify modifiers by extracting all noun phrases from each of the identified descriptions.

9. The method of claim 1, wherein the user interface provides adaptive threshold text selection in response to a box drawn by a user by identifying any text which is within the drawn box by at least a predetermined threshold.

10. The method of claim 1, wherein the user interface provides dynamic line detection by identifying a line for each word within a box drawn by a user by determining if that word overlaps an existing line or a first word in the box by at least a predetermined threshold.

11. A system for data extraction, comprising:
a processor and a first memory, the first memory storing instructions which, when executed by the processor, cause the processor to perform the following steps:
  receive an image file of a scan of a printed information list via a network connection;
  determine if the image file is in portable document format;
  when the image file is not in portable document format, process the received image file with an optical character recognition (OCR) engine to identify all text therein and store the processed image file in a second memory;
  when the image is in portable document format, process the image file using metadata and positional data at the server to:
    generate sentences,
    process the sentences to identify prices, descriptions, items, and categories,
    link each identified item to an associated price, description, and category, and
    extract and link all modifiers from each identified description; and
store all identified and extracted information as a processed portable document format file in the memory; and
  provide a user interface via the server for graphically visualizing and editing a selected one of a stored processed image file or a stored processed portable document format file, the user interface including a first pane for displaying the scan of the printed information list, a second pane for displaying a status of the identified and extracted data from the printed information list, and a set of commands for editing the identified and extracted information.

12. The system of claim 11, wherein when the image is in portable document format, the image file is processed using metadata and positional data at the server to generate sentences by processing text information character-by-character, from left to right, and designating a new sentence when a predetermined number of blank spaces are found, a new font is found, or a new font size is found.

13. The system of claim 11, wherein when the image is in portable document format, the image file is processed using metadata and positional data at the server to identify prices by stripping each currency symbol and designating each number having a value less than one thousand as a price.

14. The system of claim 13, wherein when the image is in portable document format, the image file is processed using metadata and positional data at the server to identify items by identifying one or more fonts that appear most frequently but which are not used for a description or a price.

15. The system of claim 14, wherein when the image is in portable document format, the image file is processed using metadata and positional data at the server to identify categories by identifying fonts which occur less frequently than fonts for items and which are not used for a description or a price.

16. The system of claim 14, wherein when the image is in portable document format, the image file is processed using metadata and positional data at the server to link each item among the identified items to an associated price by identifying a price among the identified prices closest to and immediately to a right of or below that item.

17. The system of claim 11, wherein when the image is in portable document format, the image file is processed using metadata and positional data at the server to identify descriptions by calculating a ratio between a separator count and a total character count for each different font found, and designating all text having the associated font as descriptions responsive to the calculated ratio being above a predetermined threshold.

18. The system of claim 17, wherein when the image is in portable document format, the image file is processed using metadata and positional data at the server to identify modifiers by extracting all noun phrases from each of the identified descriptions.

19. The system of claim 11, wherein the user interface provides adaptive threshold text selection in response to a box drawn by a user by identifying any text which is within the drawn box by at least a predetermined threshold.

20. The system of claim 11, wherein the user interface provides dynamic line detection by identifying a line for each word within a box drawn by a user by determining if that word overlaps an existing line or a first word in the box by a predetermined threshold.

\* \* \* \* \*